United States Patent [19]
Caveney et al.

[11] Patent Number: 5,134,250
[45] Date of Patent: Jul. 28, 1992

[54] WIRING DUCT

[75] Inventors: Jack E. Caveney, Hinsdale; William J. Borowski, Orland Park, both of Ill.

[73] Assignee: Panduit Corp., Tinley Park, Ill.

[21] Appl. No.: 683,392

[22] Filed: Apr. 10, 1991

[51] Int. Cl.$^5$ .............................................. H02G 3/04
[52] U.S. Cl. .................................... 174/101; 138/162; 138/165; 138/166; 174/68.3; 174/97
[58] Field of Search .................. 174/101, 68.3, 95, 97, 174/72 C, 70 C; 138/117, 162, 165, 166

[56] References Cited

U.S. PATENT DOCUMENTS

| | | | |
|---|---|---|---|
| 3,229,029 | 1/1966 | Weiss | 174/101 |
| 3,380,481 | 4/1968 | Kraus | 138/118 |
| 3,517,702 | 6/1970 | Mueller et al. | 174/68.3 |
| 3,761,603 | 9/1973 | Hays et al. | 174/101 |
| 4,286,630 | 9/1981 | Happer | 174/101 X |
| 4,388,488 | 6/1983 | Wicek et al. | 138/166 |
| 4,589,449 | 5/1986 | Bramwell | 174/101 X |
| 4,627,679 | 12/1986 | Billette de Villemeur | 174/101 X |
| 4,640,314 | 2/1987 | Mock | 174/101 X |
| 4,907,767 | 3/1990 | Corsi et al. | 174/101 X |

*Primary Examiner*—Morris H. Nimmo
*Attorney, Agent, or Firm*—Charles R. Wentzel; Mark D. Hilliard

[57] ABSTRACT

A wiring duct comprising a base and a cover for providing an opening therebetween for receipt of wires and the like. The base has a pair of sides with their free ends terminating in an arrowhead configuration. The cover is provided with a pair of arms on each side for snapping over the arrowhead to provide a positive latch therewith. The inside arm on each side of the cover is angled away from its respective outside arm to engage the leading edge of the arrowhead and provide for firm engagement with the arrowhead notwithstanding the typical range of tolerances associated with manufacturing products of this type.

25 Claims, 1 Drawing Sheet

WIRING DUCT

FIELD OF THE INVENTION

The invention relates to a wiring duct for enclosing wires and the like. More specifically, the invention relates to a two-piece duct having a base and a separate cover for latching to the base to provide an opening therebetween for receipt of wires and the like.

BACKGROUND OF THE INVENTION

The following examples of wiring ducts are known in the prior art; U.S. Pat. No. 3,229,029 to Weiss, U.S. Pat. No. 3,761,603 to Hays et al., U.S. Pat. No. 4,640,314 to Mock and U.S. Pat. No. 4,907,767 to Corsi et al.

Many of the prior art wiring ducts rely on a latching mechanism in the shape of opposing barbs for retention. Accidental forces can be applied to such mechanisms from one side to dislodge the cover. Other wiring ducts rely on more of a frictional fit cover where the assembly force is substantially the same as the separation force. Due to manufacturing tolerances the prior art wiring ducts have covers which allow for unwanted movement relative to the base.

SUMMARY OF THE INVENTION

An object of the present invention is to provide a wiring duct which minimizes the assembly force required to position the cover thereon while maximizing the accidental separation force to accidentally remove the cover and at the same time minimizing the intentional separation force required to intentionally remove the cover.

Another object of the present invention is to provide a cover latching machanism that insures no cover movement relative to the base when assembled thereto notwithstanding dimensional changes due to typical manufacturing tolerances.

A further object of the present invention is to provide a wiring duct wherein there is a positive latch between the cover and base, which positive latch may be separated by the application of a simple tool such as a screwdriver.

Yet another object of the present invention is to provide a wiring duct having a cover having walls substantially co-planar with the side walls of the base.

The foregoing objects are attained by providing a two-piece wiring duct having a base with a pair of sides which each terminate in an arrowhead configuration for engaging a cover that has a pair of arms for engaging each arrowhead. The inside arm on each side of the cover has a thickness that is less than the thickness of the outside arm on each side of the cover and each is angled away from its respective outside arm to engage the arrowhead and provide for firm engagement with the arrowhead notwithstanding the typical range of tolerances associated with manufacturing products of this type. Both the outside arm and inside arm have planar cover latching surfaces that are deflected over the widest portion of the arrowhead to provide a positive latch therewith. An abutment on each of the sides permits a screwdriver to be inserted thereagainst and twisted to intentionally remove the cover from the base.

Other objects and advantages of the invention will become apparent from the following detailed description.

DETAILED DESCRIPTION OF THE PREFERRED EMBODIMENT

Figure 1:
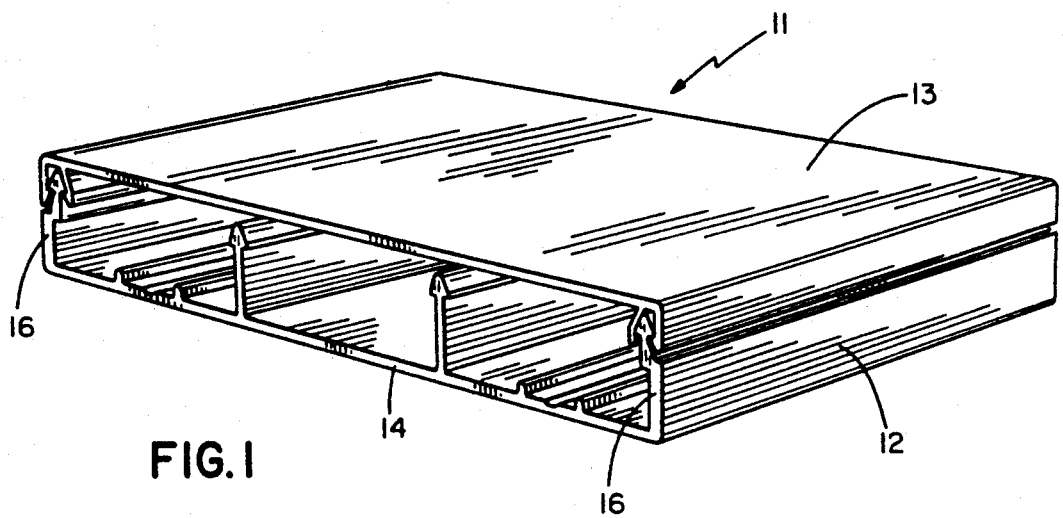
FIG. 1 is a perspective view of a short section of wiring duct of the present invention showing the cover and base assembled.

As shown in FIG. 1, the wiring duct 11 of the present invention comprises a base 12 and a cover 13. Both the base 12 and cover 13 are preferably formed by extrusion of a resilient polymeric material and can be snapped together to form the wiring duct as shown in FIG. 1.

Figure 2:
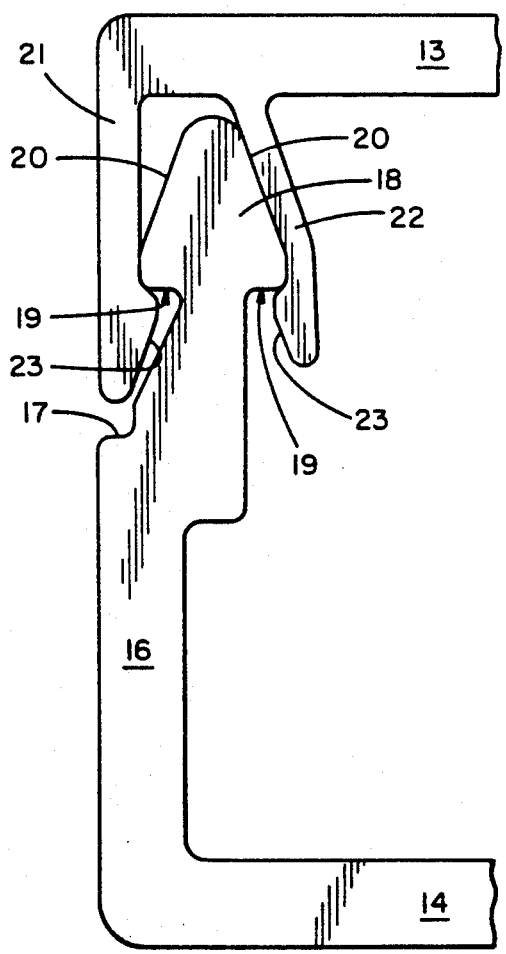
FIG. 2 is an enlarged partial end view of the wiring duct of FIG. 1.

The base 12 includes a first substantially planar member 14 having a pair of sides 16 extending substantially perpendicular to the planar member 14. The sides 16 are generally parallel to one another each having a free end terminating with side latching means to releasably secure the cover 13 to the base 12. As best shown in FIG. 2, the side 16 has an offset providing an abutment surface 17 and terminates in a free end substantially in the shape of an arrowhead 18. The side latching means comprise a pair of planar side latching surfaces 19 adjacent the widest part of the arrowhead 18 and facing substantially away from the cover 13. The arrowhead 18 is also provided with a pair of deflection surfaces 20.

The cover 13 is provided with cover latching means comprising an outside arm 21 and an inside arm 22 on each side of the cover 13. Both the outside arm 21 and inside arm 22 terminate in a free end having a cover deflection surface 23 positioned adjacent thereto for engagement with the corresponding deflection surfaces 20 on the arrowhead 18 during assembly to provide for ease of separation of the outside arm 21 and inside arm 22. Both the outside arm 21 and the inside arm 22 are provided with planar cover latching surfaces 24 facing away from the base for engagement with the side latching surfaces 19 to provide positive latching between the cover 13 and base 12. When the cover 13 is assembled with the base 12, each of the side latching surfaces 19 intersect its corresponding cover latching surface 24 at a line extending the length of the wiring duct. These four lines are parallel to each other and lie in a plane that is substantially parallel to the planar member 14. By having both an inside arm 22 and outside arm 21, each with a cover latching surface 24, the deflection required for each arm to move during insertion will be less than if only one arm moved into latching engagement. Accordingly, the assembly force can be minimized for the desired intentional separation force. Additionally, no matter which direction the cover 13 is accidentally moved, one of the cover latching surfaces 24 will remain in engagement with its corresponding side latching surface and prevent unwanted accidental separation.

The inside arm 22 is angled away from the outside arm 21 at an angle that is slightly less than the angle of the deflection surface 20. In the preferred embodiment, the width of the arrowhead 18 is intended to be slightly larger than the maximum separation of the outside arm 21 and inside arm 22. It will be appreciated that with typical manufacturing tolerances, the angled inside arm 22 will engage the deflection surface 20 on the arrowhead 18 and prevent movement of the cover relative to the base no matter whether the arrowhead 18 is slightly larger or slightly smaller than preferred.

Figure 3:
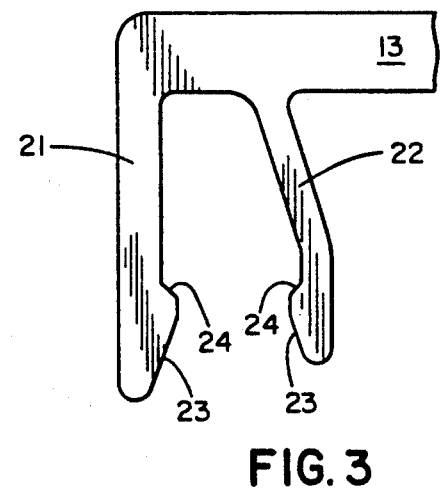
FIG. 3 is an end view of a portion of the cover of FIG. 2.
Figure 4:
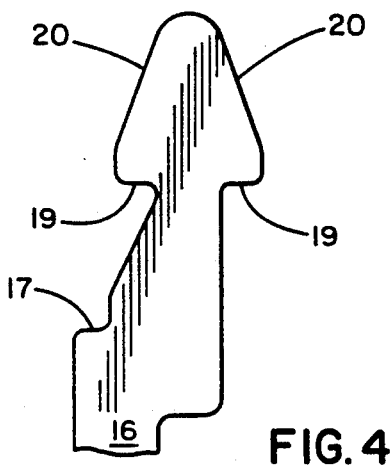
FIG. 4 is an end view of a portion of the base of FIG. 2.

As best shown in FIG. 3, the outside arm 21 has a thicker cross section than the cross section of the inside arm 22. During installation of the cover the cover deflection surfaces 23, upon engagement with the deflection surfaces 20, will cause both the outside arm 21 and inside arm 22 to deflect over the arrowhead 18. Since the outside arm 21 and inside arm 22 are positioned apart a distance less than the width of the arrowhead 18, once the cover is assembled to the base there is a force urging both the outside arm 21 and inside arm 22 to be deflected outwardly from the arrowhead 18. Since the inside arm 22 is configured with a smaller cross sectional thickness than the thickness of the outside arm 21, once the base and cover are assembled the instant invention allows the outside arm 21 to remain in a position substantially co-planar with the side 16 while the inside arm 22 remains slightly deflected from its as extruded position.

Once the cover 13 is assembled to the base 12 the side latching surfaces 19 engage the cover latching surfaces 24 to prevent accidental separation. In a wiring duct of this type it is common to change the wires contained therein and accordingly, it is desirable to intentionally remove the cover 13 from the base 12. In prior art wiring ducts having a single latch with opposed abutment surfaces that were substantially co-planar and parallel to the base, it will be appreciated that it was virtually impossible to separate such abutment surfaces in a direction transverse to the abutment surfaces without physically deforming the plastic material forming them. In the preferred embodiment the planar cover latching surfaces 24 are angled relative to the side latching surfaces 19 at an angle between 30 and 50 degrees. When it is desired to intentionally remove the cover 13, a screwdriver or similar flat instrument such as a coin could be placed on the abutment surface 17 and twisted whereupon the cover latching surfaces 24 will deflect against the side latching surfaces 19 and permit intentional removal of the cover 13 from the base 12.

In a preferred embodiment for a wiring duct 11 having an overall assembled height of 0.985 inches, the space between the outside arm and inside arm is 0.134 inches and the width of the arrowhead 18 is 0.140 inches. The thickness of the outside arm 21 is 0.040 inches and the thickness of the inside arm 22 is 0.028 inches. The inside arm 22 is angled at 18 degrees from vertical and the deflection surfaces 20 angled at 20 degrees from vertical. The cover latching surfaces 24 are positioned at an angle of 40 degrees relative to the side latching surfaces 19.

We claim:

1. A wiring duct comprising:
   a base including a first substantially planar member having a pair of sides extending transversely therefrom,
   and a cover having cover latching means at each side for engaging said base to releasably secure said cover to said base,
   each side terminating with a side latching means to releasable secure said cover to said base,
   said cover latching means at each side comprising an outside arm and an inside arm, each of said arms having arm latching means for simultaneous engagement with a corresponding side latching means,
   each side latching means having a pair of planar side latching surfaces facing away from said cover,
   each of said arm latching means having a planar cover latching surface facing away from said base,
   each of said cover latching surfaces engaging its corresponding side latching surface on a line, said lines lying in a plane substantially parallel to the planar member of said base, and
   said inside arm extending from said cover at an angle away from said outside arm.

2. The wiring duct of claim 1 wherein said side latching means has a deflection surface for engagement with said inside arm when said cover and base are assembled to prevent movement of said cover relative to said base by applying a force against said deflection surface which urges said side latching surfaces into engagement with said cover latching surfaces.

3. The wiring duct of claim 2 wherein each of said sides is provided with an abutment surface for positioning a tool to remove said cover.

4. The wiring duct of claim 1 wherein the width of said arrowhead is larger than the spacing between said outside arm and said inside arm.

5. The wiring duct of claim 1 wherein said inside arm is disposed at an angle from vertical that is less than the angle of said deflection surface.

6. The wiring duct of claim 1 wherein said inside arm has a thickness that is less than the thickness of said outside arm.

7. A wiring duct comprising:
   a base including a first substantially planar member having a pair of sides extending transversely therefrom,
   and a cover having cover latching means at each side for engaging said base to releasably secure said cover to said base,
   each side terminating with a side latching means to releasably secure said cover to said base,
   said cover latching means at each side comprising an outside arm and an inside arm, each of said arms having arm latching means for simultaneous engagement with a corresponding side latching means,
   each side latching means having a pair of planar side latching surfaces facing away from said cover,
   each of said arm latching means having a planar cover latching surface facing away from said base,
   each of said cover latching surfaces engaging its corresponding side latching surface on a line, said lines lying in a plane substantially parallel to the planar member of said base, and
   said inside arm having a thickness that is less than the thickness of said outside arm.

8. A wiring duct comprising:
   a base including a fist substantially planar member having a pair of sides extending transversely therefrom,
   and a cover having cover latching means at each side for engaging said base to releasably secure said cover to said base,
   each side terminating with a side latching means to releasably secure said cover to said base,
   said cover latching means at each side comprising an outside arm and an inside arm, each of said arms having arm latching means for simultaneous engagement with a corresponding side latching means, each side latching means having a pair of planar side latching surfaces facing away from said cover, each of said arm latching means having a planar cover latching surface facing away from said base, and each of said cover latching surfaces engaging its corresponding side latching surface on a line, said lines lying in a plane substantially parallel to the planar member o said base and each of said side latching means being in the shape of an arrowhead and said side latching surfaces being disposed adjacent the widest portion of said arrowhead, the said inside arm extending from said cover at an angle away from said outside arm.

9. The wiring duct of claim 8 wherein said inside arm is disposed at an angle from vertical that is less than the angle of said deflection surface.

10. The wiring duct of claim 9 wherein said inside arm has a thickness that is less than the thickness of said outside arm.

11. The wiring duct of claim 8 wherein said inside arm has a thickness that is less than the thickness of said outside arm.

12. A wiring duct comprising:

a base including a first substantially planar member having a pair of sides extending transversely therefrom, and a cover having cover latching means at each side for engaging said base to releasably secure said cover to said base, each side terminating with a side latching means to releasably secure said cover to said base, said cover latching means at each side comprising an outside arm and an inside arm, each of said arms having arm latching means for simultaneous engagement with a corresponding sided latching means, each side latching means having a pair of planar side latching surfaces facing away from said cover, each of said arm latching means having a planar cover latching surface facing away from said base, and each of said cover latching surfaces engaging its corresponding side latching surface on a line, said lines lying in a plane substantially parallel to the planar member of said base and each of said side latching means being in the shape of an arrowhead and said side latching surfaces being disposed adjacent the widest portion of said arrowhead, and said inside arm having a thickness that is less than the thickness of said outside arm.

13. A wiring duct comprising:

a base including a first substantially planar member having a pair of sides extending transversely therefrom, and a cover having cover latching means at each side for engaging said base to releasably secure said cover to said base, each side terminating with a side latching means to releasably secure said cover to said base, said cover latching means at each side comprising an outside arm and an inside arm, each of said arms having arm latching means for simultaneous engagement with a corresponding side latching means, each side latching means having a pair of planar side latching surfaces facing away from said cover, each of said arm latching means having a planar cover latching surface facing away from said base, and each of said cover latching surfaces engaging its corresponding side latching surface on a line, said lines lying in a plane substantially parallel to the planar member of said base, and each of said cover latching surfaces being disposed at an angle of approximately 40 degrees relative to its corresponding side latching surface.

14. A wiring duct comprising:

a base including a first substantially planar member having a pair of sides extending transversely therefrom, and a cover having cover latching means at each side for engaging said base to releasably secure said cover to said base, each side terminating with a side latching means to releasably secure said cover to said base, said cover latching means at each side comprising an outside arm and an inside arm, each of said arms having arm latching means for simultaneous engagement with a corresponding side latching means, each side latching means having a pair of planar side latching surfaces facing away from said cover, each of said arm latching means having a planar cover latching surface facing away from said base, said inside arm extending from said cover at an angle away from said outside arm, said side latching means having a deflection surface disposed at an angle for engagement with said inside arm when said cover and base are assembled to prevent movement of said cover relative to said base by applying a force against said deflection surface which urges said side latching surfaces into engagement with said cover latching surfaces.

15. The wiring duct of claim 14 wherein each of said side latching means is in the shape of an arrowhead and said side latching surfaces are disposed adjacent the widest portion of said arrowhead.

16. The wiring duct of claim 15 wherein said inside arm has a thickness that is less than the thickness of said outside arm.

17. The wiring duct of claim 14 wherein said inside arm is disposed at an angle from vertical that is less than the angle of said deflection surface.

18. The wiring duct of claim 17 wherein said inside arm has a thickness that is less than the thickness of said outside arm.

19. The wiring duct of claim 17 wherein the width of said arrowhead is larger than the spacing between said outside arm and said inside arm.

20. The wiring duct of claim 14 wherein said inside arm has a thickness that is less than the thickness of said outside arm.

21. The wiring duct of claim 14 wherein the width of said arrowhead is larger than the spacing between said outside arm and said inside, arm.

22. The wiring duct of claim 14 wherein each of said cover latching surfaces engages its corresponding side latching surfaces on a line, said lines lying in a plane substantially parallel to the planar member of said base.

23. The wiring duct of claim 14 wherein each of said sides is provided with an abutment surface for positioning a tool to remove said cover.

24. The wiring duct of claim 14 wherein each of said cover latching surfaces is disposed at an angle of between 30 and 50 degrees relative to its corresponding side latching surface.

25. The wiring duct of claim 24 wherein said angle is 40 degrees.

* * * * *

UNITED STATES PATENT AND TRADEMARK OFFICE
CERTIFICATE OF CORRECTION

PATENT NO. : 5,134,250
DATED : July 28, 1992
INVENTOR(S) : Caveney et al.

It is certified that error appears in the above-identified patent and that said Letters Patent is hereby corrected as shown below:

Column 3, line 64, change "releasable" to --releasably--.

Column 5, line 11, change "o" to --of--.

Column 5, line 15, change "the" to --and--.

Column 5, line 39, change "sided" to --side--.

Column 6, line 32, change "surfaces" to --surface--.

Signed and Sealed this

Fourteenth Day of September, 1993

*Attest:*

BRUCE LEHMAN

*Attesting Officer*      *Commissioner of Patents and Trademarks*